3,284,380
POLAR POLYMER MODIFIED-ETHYLENE-
PROPYLENE COPOLYMER LATICES
James W. Davis, Wilmington, Del., assignor to Hercules
Incorporated, a corporation of Delaware
No Drawing. Filed July 14, 1961, Ser. No. 124,007
9 Claims. (Cl. 260—8)

The present invention relates to latices of modified ethylene-propylene copolymers and, more particularly, to high solids latices of ethylene-propylene copolymers modified by blending with a small amount of a polar polymer, and to the use of same as coating adhesives in paper coating color compositions.

By the term "polar polymer" is meant a polymer which contains polar groups, i.e., carboxylic acid, hydroxyl, amide, amine, etc., and which, when blended with an ethylene-propylene copolymer, will appreciably increase the polarity.

The use of high solids ethylene-propylene latices as coating adhesives for paper has been attended with difficulties for several reasons. For example, the adhesion of such copolymers to polar surfaces is only fair. Another reason is that, in order to obtain stable latices, such high concentrations of dispersing agents must be used as to be incompatible with the copolymer and prevent the formation of coherent coatings.

It has now been discovered that by blending a polar polymer with an ethylene-propylene copolymer modified latices can be prepared which are particularly useful as coating adhesives in paper coating color compositions.

Any polar polymer which is compatible with ethylene-propylene copolymers can be used in the practice of this invention. Exemplary of such polymers are poly(butadiene-styrene-maleic anhydride),
poly(butadiene-styrene-acrylic acid),
poly(butadiene-styrene-allyl amine),
poly(butadiene-styrene-methacrylic acid),
poly(butadiene-maleic anhydride),
poly(butadiene-vinyl pyridine),
poly(butadiene-methacrylic acid),
poly(isobutylene-allyl amine),
poly(isobutylene-acrylic acid),
poly(isoprene-vinyl pyridine),
poly(isoprene-maleic anhydride),
poly(propylene-maleic anhydride),
poly(propylene-methacrylic acid),
poly(ethylene-propylene-acrylic acid),
poly(ethylene-propylene-maleic anhydride),
poly(ethylene-maleic anhydride),
poly(ethylene-methacrylic acid), etc.

Those polymers containing carboxyl groups are most preferred. For a description of the preparation of such polymers, see U.S. Patents 2,654,671, 2,662,874, 2,669,550, and 2,868,754.

The amount of polar polymer employed will depend on its polarity and on the other coating materials used. In general, however, the ratio of polar polymer to ethylene-propylene copolymer will vary from about 1% to about 25%, and more preferably from about 5% to about 15%.

The ethylene-propylene copolymers useful in the practice of this invention are the normally solid copolymers. These copolymers are materials known to the art which can be prepared by copolymerizing ethylene with propylene by any of several methods, such as the methods described in Belgian Patents 535,082, 538,782, 553,655, and 583,039; and U.S. Patents 2,700,663 and 2,726,231. Those copolymers containing from about 24% to about 55%, most preferably from about 28% to about 36%, by weight propylene and having a reduced specific viscosity (RSV) of from about 0.8 to about 8.0 are useful in this invention.

The term "Reduced Specific Viscosity," which is a function of molecular weight, is used herein to designate the $\eta sp/c$ determined on a 0.1% solution of the copolymer in decahydronaphthalene measured at a temperature of 135° C.

It will be understood, of course, that the polymers of other $\alpha$-olefins having essentially equivalent properties can be used in place of the ethylene-propylene copolymers. For example, the homopolymers of butene-1, pentene-1, and their copolymers with ethylene, etc., can be used to replace the ethylene-propylene copolymers in the modified latices of this invention. These polymers can be prepared by the same general methods used to prepare the copolymers of ethylene and propylene.

The latices of this invention can be prepared by any one of a number of procedures. One convenient procedure is to prepare solutions of the ethylene-propylene copolymer and the polar polymer in inert organic solvents, blend the solutions, and then form an oil-in-water emulsion by mixing with water and a small amount of surface-active agent. The oil-in-water emulsion can then be stripped of the organic solvent or solvents by steam distillation to give a dilute latex. Another procedure is to admix the ethylene-propylene copolymer and the polar polymer in the dry state, prepare a solution from the dry mixture, and then form a dilute latex as described above. Still another procedure is to form latices of the polar and nonpolar polymers separately and then mix them together. These latices can, if desired, be concentrated by known methods. Latices having various total solids compositions can be prepared; however, the total solids composition will usually be from about 40% to about 60% solids.

In the preparation of a coated paper, it is conventional to prepare a mixture of water and a pigment, such as clay or the like, optionally together with other materials, such as, for example, a soluble pyrophosphate which may act as a stabilizing agent. This mixture, otherwise known as a pigment slip or, since it generally contains clay, as a clay slip, is then compounded with a binder or coating adhesive, such as starch, to produce a composition known in the art as a coating color which is useful for coating paper. Considerable quantities of the adhesive are used, and, accordingly, its composition and characteristics are of great importance in determining the quality of the finished paper. Important properties of the adhesive are that it must impart to the finished paper a high degree of brightness, smoothness and gloss, and a good finish and feel after calendering. In addition to these basic qualities, there are various other characteristics that go far toward determining the value and utility of coating adhesives: (1) the coating color must flow smoothly and evenly so that it may be applied to paper at sufficiently high speeds to be economical in ordinary coating processes, and (2) the coating must have high strength to permit subsequent printing on the coated paper without "picking."

Now, in accordance with the present invention, there is utilized as a coating adhesive a composition of matter comprising an ethylene-propylene copolymer latex modified by blending with a small amount of a polar polymer. This latex is mixed with a pigment slip and, optionally, other ingredients to form a coating color which, when coated on a paper surface, provides brightness, smoothness and gloss, a good finish and feel after calendering, and high strength.

For optimum results in the coating of paper, it is preferred to prepare a coating color having a total solids composition which is relatively high, thus combining surface coating qualities with economical operations. Since the modified latices of this invention reduce the viscosity of coating colors, it is possible to use higher solids colors and, hence, to coat at a faster rate without increasing the drying capacity of the machine. A preferred range of total solids for the coating color is between about 30 and about 70% solids with an optimum value at from about 50% to about 65%. If the modified latex is used as the sole adhesive in the coating color, it will be present in an amount between about 5% and about 25% based on the weight of clay, and preferably between about 6% and about 18%. A composition containing an amount of total solids and adhesive in this range is characterized by being readily applied to the surface of paper and by forming a highly resistant coating thereon. Thus, utilizing the coating color according to this invention there is produced a coated paper which is highly satisfactory for use in printing operations and is resistant to disturbance of the coated surface through rubbing, picking, and the like. The modified latices of this invention can be used as the sole adhesive or merely to replace a part of the adhesive (starch or casein) in a conventional coating color. Where the modified latices are used to replace a part of the starch or casein in a conventional coating color, they will be present in an amount of at least 10% by weight based on total adhesives.

In place of the clay utilized as the pigment, there can be used other paper coating compositions and materials, such as, for example, calcium sulfate, calcium carbonate, titanium dioxide, or other coating pigments alone or preferably with a clay base. The modification of the coating color using these materials will be within the knowledge of those skilled in the art.

The utility of the coating color is not limited to the type of paper pulp used, and, accordingly, it can be utilized with the various types of kraft, soda, sulfite pulp, and the like, as well as with the various chemical and semi-chemical paper pulps. By the same token, the invention can be utilized with various types of paper products, such as paper, fiberboard, and the like. In all instances, the product produced is characterized by being relatively resistant to abrasion and having a surface of improved printing properties.

The general nature of the invention having been set forth hereinbefore, the following examples are presented for purposes of illustration, parts and percentages being by weight unless otherwise stated.

The Hercules Print Tester mentioned in the examples is an instrument developed for measuring the picking resistance of coated printing papers. The instrument embodies the basic principles of a printing press. Small strips of the test specimen are printed with an ink-like material under controlled conditions. The speed of printing is increased by small increments until picking of a test strip occurs. For a more complete description of the print tester, see E. J. Barber et al., TAPPI, vol. 34, No. 10, October, 1951, published by Technical Association of the Pulp and Paper Industry.

*Example 1*

To a polymerization vessel was charged 1750 parts of chlorobenzene. The vessel was evacuated and the chlorobenzene saturated with propylene. The vessel was evacuated again and finally pressurized to 30 p.s.i.g. at 60° C. with a 50:50 mixture of ethylene and propylene. To catalyze the copolymerization, separate streams of heptane solutions of tert-butyl orthovanadate (0.02M) and aluminum diethyl chloride (0.1M) were continuously pumped into the vessel. The total tert-butyl orthovanadate used amounted to 0.097 part, and the total aluminum diethyl chloride used amounted to 0.214 part. Pressure was maintained at 30 p.s.i.g. by adding a blend of 80% ethylene and 20% propylene as required. After one hour the addition of catalysts was stopped and the copolymerization was quenched by adding 8.1 parts of butanol. The resulting viscous solution was washed with half its volume of 10% aqueous hydrochloric acid and then with water until neutral. The product had a solids content of 3.94%, which was composed of an ethylene-propylene copolymer having an RSV of 3.8. An analysis of the copolymer showed that it contained 24.3% propylene and 75.7% ethylene.

To 274 parts of the above chlorobenzene solution of the ethylene-propylene copolymer was added 26.3 parts of a chlorobenzene solution of a polar terpolymer prepared from butadiene, styrene, and methacrylic acid having a 4.62% solids content. Then 181 parts of the resulting solution were emulsified by adding 0.9 part of an alkyl sulfate anionic surface-active agent in a mixed solvent composed of 8 parts of water and 1.5 parts of butanol and vigorously agitating. After 5 minutes 72 additional parts of water were added and the water-in-oil emulsion inverted to form an oil-in-water emulsion. From this emulsion a dilute latex was formed by steam stripping the chlorobenzene. The resulting latex had a solids content of 3.53% and an average particle size of <0.5 micron. It was concentrated to 8.46% solids by distillation under nitrogen. Then it was mixed with 15 parts of a 1% aqueous solution of carboxymethylcellulose and allowed to stand overnight. Two layers formed. The bottom layer, essentially water, was removed leaving a latex containing approximately 50% solids.

An unmodified ethylene-propylene latex was prepared as described above except the addition of terpolymer modifying agent was omitted and 1.5 times the amount of surface-active agent was required to form the intermediate emulsion.

A clay slip was prepared by mixing 140 parts of fine kaolin coating clay with 60.7 parts of a 1% aqueous solution of sodium pyrophosphate. After agitating several minutes, a smooth suspension was obtained. To 143 parts of the clay slip was added 40 parts of the modified latex and a small amount of anticoagulant. The pH was adjusted to 9.0 with 10% aqueous sodium hydroxide to yield a smooth coating color containing 20% of the adhesive binder based on the weight of the clay and having a 60% total solids composition. Another coating color was prepared from the unmodified latex in the exact same manner.

The thus prepared coating colors were coated on several sheets of letter press raw stock using a standard paper coating machine, and dried on a drum drier to a moisture content of 6%. All of the sheets were then conditioned for 24 hours at 22° C. and 50% relative humidity. Each sheet was tested on the Hercules Print Tester using a viscosity rated printing ink. The modified latex coating color failed at a printing speed of 4. The coating color prepared with ethylene-propylene copolymer failed at a speed of 1.

*Example 2*

A copolymer of ethylene and propylene was prepared in heptane using a mixture of tert-butyl orthovanadate and aluminum sesquichloride as the catalysts by the same general procedure as described in Example 1. The copolymer product had a propylene content of 34.4% and an RSV of 2.8. The heptane solution of the copolymer had a solids content of 8.43%.

To 220 parts of the above heptane solution of ethylene-propylene copolymer was added 39 parts of a chlorobenzene solution of a polar terpolymer prepared from butadiene, styrene, and methacrylic acid having a 4.62% solids content. The resulting solution, containing 91% copolymer and 9% terpolymer, based on the total solids, was emulsified by adding 2.2 parts of butanol and 10 parts of a 20% aqueous solution of an alkyl sulfate anionic surface-active agent and vigorously agitating. After 5 minutes 150 additional parts of water were added and the water-in-oil emulsion inverted to form an oil-in-water emulsion. From this emulsion a dilute latex was formed by steam stripping the volatile solvents. The resulting latex had a solids content of 4.77% and an average particle size of 0.5 to 1 micron. It was then concentrated with carboxymethylcellulose as described in Example 1 to produce a latex containing approximately 40% solids.

An unmodified ethylene-propylene latex was prepared as described above except the addition of terpolymer modifying agent was omitted and 2 times the amount of surface-active agent was required to form the intermediate emulsion.

Coating colors were prepared from (1) the modified ethylene-propylene copolymer latex and (2) the unmodified ethylene-propylene copolymer latex. Both ethylene-propylene copolymer latex coating colors were prepared as described in Example 1. In each case a fine kaolin coating clay was used as the pigment.

The thus prepared coating colors were coated on several sheets of letter press raw stock using a standard paper coating machine, and dried on a drum drier to a moisture content of 6%. All of the sheets were then conditioned for 24 hours at 22° C. and 50% relative humidity. Each sheet was tested on the Hercules Print Tester using a viscosity rated printing ink. The modified latex coating color failed at a printing speed of 6. The coating color prepared with ethylene-propylene copolymer failed at a speed of 3.

*Example 3*

To 216 parts of the heptane solution of ethylene-propylene copolymer of Example 2 was added 40 parts of a 5% chlorobenzene solution of a polar copolymer prepared from the polymerization of 90 parts of butadiene and 10 parts of 2-vinyl pyridine in the presence of a benzoyl peroxide catalyst. The resulting solution, containing about 90% nonpolar copolymer and 10% polar copolymer, based on the total solids, was emulsified and converted to a latex exactly as described in Example 2. After concentrating with carboxymethylcellulose as described in Example 1, the latex contained 48.5% solids having an average particle size of 0.5 micron.

An unmodified ethylene-propylene latex was prepared as described above except the addition of polar copolymer was omitted and 2 times the amount of surface-active agent was required to form the intermediate emulsion.

Coating color compositions were prepared from the above latices as follows: To each 6.7 parts of latex was added 0.5 part of 20% aqueous sodium caseinate solution, and then each latex was added to a blend of 80 parts of 70% clay slip, 0.7 part sodium pyrophosphate, and 33.6 parts of a 20% aqueous starch solution. Each of the resulting coating colors were then coated on ledger stock and tested as described in Example 1. The coated paper prepared from the modified latex coating color failed at a printing speed of 5, while the coated paper prepared from the unmodified latex coating color failed at a printing speed of 2.

In addition to being useful as coating adhesives for paper, the latices of this invention can be used in the preparation of tire cord coating compositions, emulsion paints, resilient concrete, binder for cork, wood, leather buffings, etc.

What I claim and desire to protect by Letters Patent is:

1. A paper coating color comprising an aqueous dispersion of substantial quantities of a pigment and an adhesive, said adhesive containing at least 10% by weight of a latex of an ethylene-propylene copolymer containing from about 24% to about 55% by weight of propylene, said latex being modified by blending with a polymer in an amount from about 1% to about 25% by weight, based on total weight of polymer and copolymer, said polymer being compatible with ethylene-propylene copolymers and containing polar radicals selected from the group consisting of carboxylic acid, hydroxyl, and amide radicals.

2. The composition of claim 1 wherein said adhesive is a mixture of starch and at least 10% by weight of said latex.

3. The composition of claim 1 wherein said adhesive is a mixture of casein and at least 10% by weight of said latex.

4. The composition of claim 1 wherein said adhesive is essentially entirely said latex.

5. In a process of coating a paper with a coating color comprising an aqueous dispersion of substantial quantities of a pigment and an adhesive, the improvement of using an adhesive containing at least 10% by weight of a latex of an ethylene-propylene copolymer containing from about 24% to about 55% by weight of propylene, said latex being modified by blending with a polymer in an amount from about 1% to about 25% by weight, based on total weight of polymer and copolymer, said polymer being compatible with ethylene-propylene copolymers and containing polar radicals selected from the group consisting of carboxylic acid, hydroxyl, and amide radicals.

6. A coated paper comprising a paper web having a coating comprising a pigment and an adhesive, said adhesive containing at least 10% by weight of a latex of an ethylene-propylene copolymer containing from about 24% to about 55% by weight of propylene, said latex being modified by blending with a polymer in an amount from about 1% to about 25% by weight, based on total weight of polymer and copolymer, said polymer being compatible with ethylene-propylene copolymers and containing polar radicals selected from the group consisting of carboxylic acid, hydroxyl, and amide radicals.

7. A paper coating color comprising an aqueous dispersion of substantial quantities of a clay pigment and an adhesive, said adhesive consisting essentially of a latex of an ethylene-propylene copolymer containing from about 24% to about 55% by weight of propylene, said latex being modified by blending with a butadiene-styrene-methacrylic acid terpolymer in an amount of about 5% to about 15% by weight, based on the total weight of copolymer and terpolymer.

8. The composition of claim 1 wherein said polymer contains carboxylic acid groups.

9. The composition of claim 8 wherein the said polymer is a terpolymer of butadiene, styrene and methacrylic acid.

References Cited by the Examiner

UNITED STATES PATENTS

| | | | |
|---|---|---|---|
| 2,537,114 | 1/1951 | Young et al. | 260—8 |
| 2,685,571 | 8/1954 | Stinchfield et al. | 260—8 |
| 2,859,193 | 11/1958 | Kowalewski | 260—29.7 |
| 2,944,040 | 7/1960 | Pollock et al. | 260—29.6 |
| 2,994,677 | 8/1961 | Bohnert et al. | 260—892 |
| 3,055,855 | 9/1962 | Anderson et al. | 260—29.7 |

FOREIGN PATENTS

| | | |
|---|---|---|
| 583,039 | 1/1960 | Belgium. |
| 857,183 | 12/1960 | Great Britain. |
| 108,020 | 6/1958 | Pakistan. |

OTHER REFERENCES

Stilbert: "Paper Trade Journal," Industrial Development Section, April 7, 1949, pp. 27–8.

WILLIAM H. SHORT, *Primary Examiner.*

ALPHONSO D. SULLIVAN, JAMES A. SEIDLECK, S. H. BLECH, J. J. NORRIS, E. M. WOODBERRY, *Assistant Examiners.*